(12) United States Patent
Kazama et al.

(10) Patent No.: US 8,873,173 B2
(45) Date of Patent: Oct. 28, 2014

(54) OBJECT LENS DRIVE UNIT AND OPTICAL PICKUP USING THE SAME

(75) Inventors: Atsushi Kazama, Hitachinaka (JP); Katsuhiko Kimura, Kasumigaura (JP); Takahiro Yamaguchi, Yokohama (JP); Souichirou Yamada, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 193 days.

(21) Appl. No.: 13/430,816

(22) Filed: Mar. 27, 2012

(65) Prior Publication Data

US 2012/0314313 A1 Dec. 13, 2012

(30) Foreign Application Priority Data

Jun. 13, 2011 (JP) ................... 2011-131006

(51) Int. Cl.
*G02B 7/02* (2006.01)
*G11B 7/09* (2006.01)

(52) U.S. Cl.
CPC .................... *G11B 7/0932* (2013.01)
USPC .......................... 359/824; 359/814

(58) Field of Classification Search
USPC .................................... 359/814, 824
See application file for complete search history.

(56) References Cited

FOREIGN PATENT DOCUMENTS

| JP | 57-191084 U | 12/1982 |
|----|-------------|---------|
| JP | 08-111031 A | 4/1996 |
| JP | 2004-319006 A | 11/2004 |
| JP | 2007-188596 A | 7/2007 |

*Primary Examiner* — Alicia M Harrington
(74) *Attorney, Agent, or Firm* — Mattingly & Malur, PC

(57) ABSTRACT

In the object lens drive unit including a lens holder with an object lens attached to, a plurality of driving coils attached to the lens holder, connection substrates attached to both sides of the lens holder, and a plurality of suspension wires with end parts thereof connected to the connection substrates for operatively supporting the lens holder, a plurality of sets of wire connection electrodes for connecting the suspension wires and coil connection electrodes electrically connected to the wire connection electrodes for connecting terminal wires of the coils are arranged in line in an optic axis direction of the object lens and the wire connection electrodes and the coil connection electrodes are formed in a symmetric shape to a central axis parallel to the optic axis direction on the connection substrates.

7 Claims, 5 Drawing Sheets

OBJECT LENS DRIVE UNIT AND OPTICAL PICKUP USING THE SAME

CLAIM OF PRIORITY

The present application claims priority from Japanese patent application serial No. 2011-131006, filed on Jun. 13, 2011, the content of which is hereby incorporated by reference into this application.

FIELD OF THE INVENTION

The present invention relates to an object lens drive unit included in an optical disk unit for reading information recorded on a recording face of an optical disk or recording information on the optical disk and an optical pickup using the same.

BACKGROUND OF THE INVENTION

A general object lens drive unit included in the optical pickup of the optical disk unit is composed of a lens holder with an object lens loaded, a plurality of coils attached to the lens holder, a suspension wire for operatively supporting movable units including the aforementioned, a yoke, and a magnet.

When a drive current is applied to the coils, the movable units are driven by electromagnetic force generated due to an action with magnetic flux from the magnet. The drive direction includes a direction in which the object lens approaches or parts from the optical disk face, that is, a focusing. direction (z direction) which is an optic axis direction of the object lens, a tracking direction (y direction) that is perpendicular to the focusing direction and is a radial direction of the optical disk, and a tilt direction rotating round an axis in a direction (x direction) perpendicular to the focusing direction and tracking direction, and a coil corresponding to each direction is installed. Further, the driving in the tilt direction may not be realized.

The power supply to the coils is realized via the suspension wire. When the three drive directions are used, three suspension wires are accordingly arranged at both ends of the lens holder.

When assembling such an object lens drive unit, it is necessary to mechanically connect the suspension wires to the lens holder and electrically connect the suspension wires and the terminal wires of the coils.

A conventional example in which exclusive substrates for this connection are arranged at both ends of the lens holder is disclosed in Japanese Patent Laid-open No. 2007-188596 (Patent Document 1). The Patent Document 1 describes the substrates that enable decreasing the size of the substrates in the z direction so as to achieve a thin optical pickup while ensuring the operability at the time of soldering of the suspension wires.

PRIOR ART DOCUMENT

Patent Document

PATENT DOCUMENT 1: Japanese Patent Laid-open No. 2007-188596

SUMMARY OF THE INVENTION

The connection substrates for connecting the suspension wires and coil terminal wires are arranged on both sides (left and right) of the lens holder. If the connection substrates are different between the right substrate and the left substrate, an increase in the kinds of parts is caused and there are possibilities of an occurrence of misadherence of the left substrate on the right side.

In the embodiment described in the patent document 1, there are possibilities that the same substrate can be turned over so as to be shared on both sides of the lens holder; however, its structure of pulling out the winding of each coil from both sides of the connection substrate is a problem.

The suspension wires are soldered to the connection substrates. With the growing trend of making optical disk thinner in recent years, the soldering portions has become minute and the positioning of the suspension wires and connection substrates is important. In this case, failure to not only determine the position on the plane of each substrate but position the distance between the substrate and the suspension wire with high precision can cause the lens holder to be inclined and fixed. Therefore, a wire guide for positioning each suspension wire is generally installed in the neighborhood of the connection substrate.

On the other hand; in the patent document 1 aforementioned, the structure that the terminal wires of each coil are pulled out on both sides of the connection substrate is provided, so that it is a structure that the wire guide cannot be installed.

An object of the present invention is to provide an object lens drive unit that allows connecting the suspension wires and lens holder with high precision and, by using the same connection substrates on both sides of the lens holder, can reduce the kinds of parts and realize a reduction in the manufacturing cost and an optical pickup using the same.

The above object is accomplished, in the object lens drive unit including the lens holder with the object lens attached to, the plurality of driving coils attached to the lens holder, the connection substrates attached to both sides of the lens holder, and the plurality of suspension wires with the end parts thereof connected to the connection substrates for operatively supporting the lens holder, due to the structure that on the connection substrates, a plurality of sets of the wire connection electrodes for connecting the suspension wires and the coil connection electrodes electrically connected to the wire connection electrodes for connecting the coil terminal wires are arranged in line in the optic axis direction of the object lens and the wire connection electrodes and coil connection electrodes are in a symmetric shape to the central axis parallel to the optic axis direction.

Further, in the above object, it is preferable that the connection substrates have cutout portions on the sides in correspondence to the coil terminal wires and the cutout portions are arranged on both sides symmetrically to the central axis.

Further, in the above object, it is preferable that the lens holder has a wire guide with a guide portion for permitting each suspension wire to pass through installed and the wire guide is adjacent to the side of the connection substrate in the extension direction of the suspension wire and is installed so as to project from the lens holder.

Further, in the above object, it is preferable that the wire connection electrodes and coil connection electrodes are separated and formed in a rectangular shape and the separated wire connection electrodes and coil connection electrodes are connected with wires.

According to the present invention, an object lens drive unit that allows reducing the number of parts and decreasing the manufacturing cost by permitting the same substrates to be used on both sides of the lens holder and an optical pickup using the same can be provided.

DESCRIPTION OF THE PREFERRED EMBODIMENTS

Figure 1:
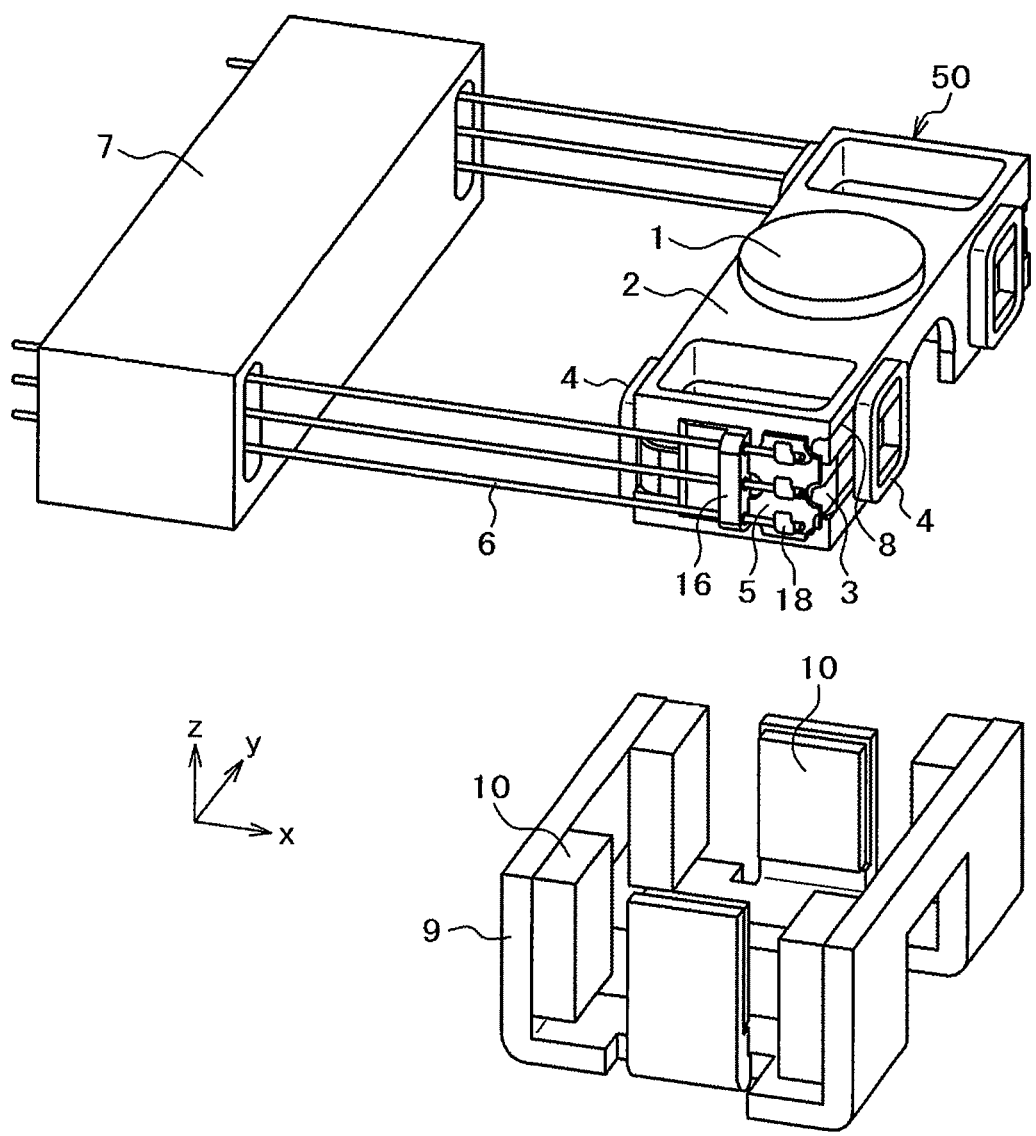
FIG. 1 is a drawing for showing an embodiment of the object lens drive unit of the optical pickup relating to the present invention.

Hereinafter, the embodiments of the present invention will be explained with reference to the accompanying drawings.

The lens holder is supported by three suspension wires on one side and three suspension wires on the other side, six suspension wires in total. Further, three terminal wires are connected to each of the left and right sides of the lens holder via the connection substrates along with the suspension wires.

To the connection substrates attached to the lens holder, the suspension wires and terminal wires are connected by soldering. However, the soldering operation, since the soldering connection portion is minute, requires advanced soldering technique. Particularly, in recent years, in correspondence to the thin note type PC, the lens holder is thinned, and the soldering connection portion becomes minuter, and a high degree of technology is required increasingly.

Therefore, to prevent defective soldering, the position relationship between the connection substrates and the suspension wires is very important. Therefore, generally, each suspension wire is fixed to the wire guide installed in the neighborhood of the connection substrate, thus the suspension wire is positioned; the connection substrate uses the side close to the wire guide as a stopper face to the wire guide, executes positioning to the wire guide, forms a guide for pulling out the coil winding on the other side, thereby is not in a shape symmetrical right and left. Therefore, on both sides of the lens holder, the exclusive substrates for the left side and right side are used and an increase in the kinds of parts is caused.

Therefore, the inventors of the present invention variously examined the structure that the connection substrates are formed symmetrically right and left and can be shared on both right and left sides of the lens holder and as a result, obtained the embodiments as indicated below.

{Embodiment 1}

The object lens drive unit relating to an embodiment of the present invention will be explained by referring to the drawings.

FIG. 1 is a perspective view of an object lens drive unit 50 relating to an embodiment of the present invention.

To make the drawing easy to see, FIG. 1 shows the yoke, magnet, and other portions which are separated up and down. Further, the z direction shown in FIG. 1 is the focusing direction in which an object lens 1 approaches or parts from an optical disk not drawn along the optical axis of the object lens 1 and the y direction is the tracking direction in which the optical lens 1 is operated in the radial direction of the optical disk. The direction rotating round the axis in the x direction is the tilt direction.

In FIG. 1, the object lens 1 of the object lens drive unit 50 is loaded on the top surface of a lens holder 2. A focusing coil 3 and a tilt coil are formed using the z direction as a winding axis and are attached to the lens holder 2. The tilt coil, in FIG. 1, hides in the lens holder 2, thereby is not displayed. A tracking coil 4 is formed using the x direction as a winding axis and is attached to the side of the lens holder 2 which is perpendicular to the x-axis. To both sides of the lens holder 2 perpendicular to the y-axis, connection substrates 5 are attached. A suspension wire 6 is connected by soldering with one end to the connection substrate 5 and the other end to a fixing portion 7 and by three suspension wires on both sides of the lens holder 2, that is, six suspension wires in total, the lens holder 2 is operatively supported by the fixing portion 7. A wire guide 16 and a soldering portion 18 will be described later.

The end part of each winding (hereinafter, called a coil terminal wire 8) of the focusing coil 3, the tracking coil 4, and the tilt coil, is connected to the connection substrate 5 by soldering or the like and is electrically connected to the corresponding suspension wire 6 on the connection substrate 5.

A current is supplied to each coil via the suspension wire 6, thus between a yoke 9 of a magnetic substance and the magnetic field generated by a magnet 10 attached to the yoke 9, an electromagnet action is functioned, and drive force is generated in each direction, thus the lens holder 2 can be driven.

Figure 2:
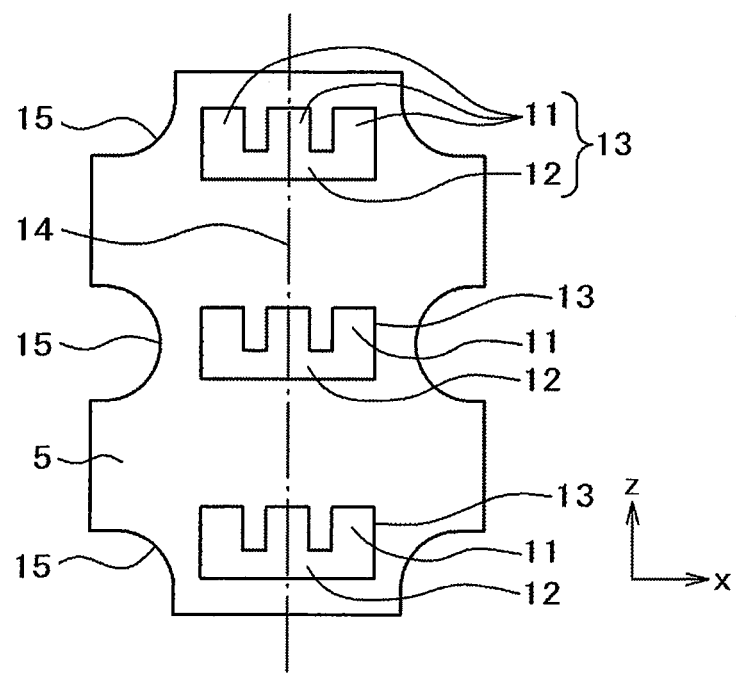
FIG. 2 is a plan view of the connection substrate included in the object lens drive unit relating to the present invention.

FIG. 2 is a plan view showing the detailed shape of the connection substrate.

FIG. 3 is a plan view showing the operation process of soldering the suspension wire and coil terminal wire to the connection substrate shown in FIG. 2.

In FIG. 2, in the connection substrate 5, three sets of a wire connection electrode 11 for connecting the suspension wire 6 and a coil connection electrode 12 for connecting the coil terminal wire 8 are arranged. The coil connection electrode 12 is formed in a rectangular shape long in the x direction, and the wire connection electrode 11 is formed in a similar rectangular shape divided into three parts in the x direction, and the two are mutually adjacent and connected to each other in the z direction, thereby forming a connection electrode 13. Furthermore, three connection electrodes 13 are arranged in line in the z direction. These connection electrodes 13 are in a symmetric shape to a central axis 14 of the connection substrate 5 parallel to the z direction. Further, in the end sides of the connection substrate 5 parallel to the z direction, R-shaped cutout portions 15 are formed and the external form of the connection substrate 5 including the R-shaped cutout portions 15 is in a symmetric shape to the central axis 14.

Figure 3A:
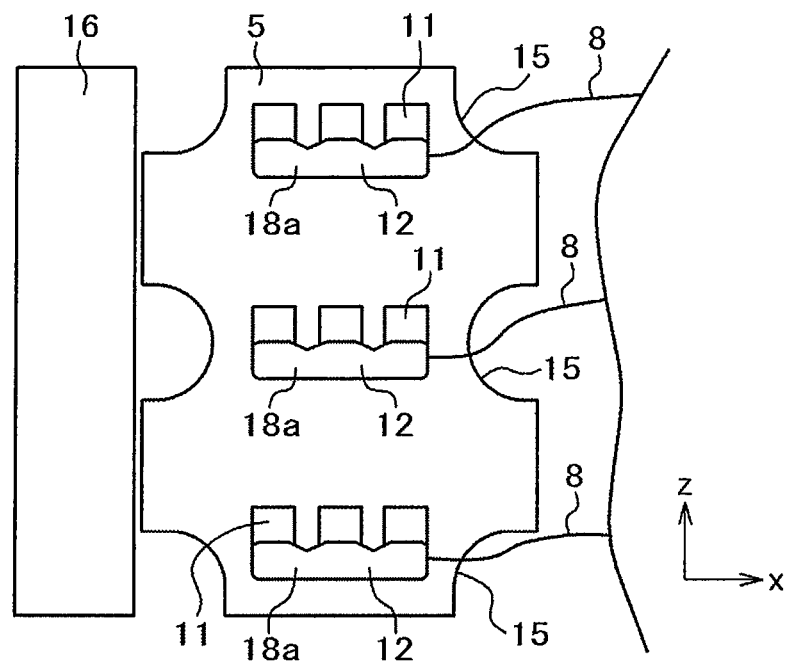
FIG. 3A is a plan view showing the soldering operation process 1 to the connection substrate shown in FIG. 2.
Figure 3B:
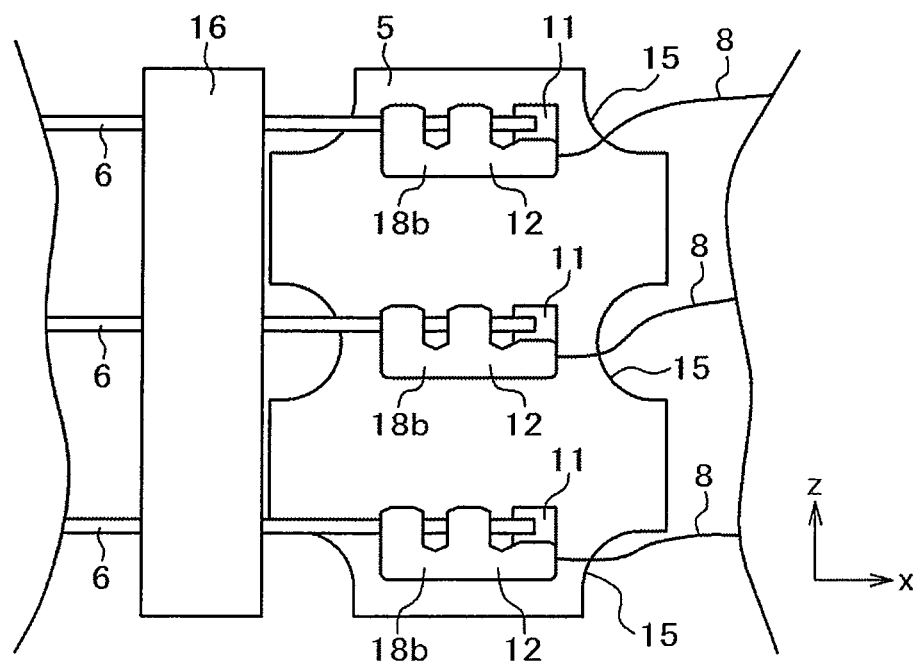
FIG. 3B is a plan view showing the soldering operation process 2 to the connection substrate shown in FIG. 2.

When assembling, as shown in FIG. 3A, firstly, the end part of the coil terminal wire 8 is soldered to the coil connection electrode 12. Next, as shown in FIG. 3B, the suspension wire 6 is positioned through the guide hole of the wire guide 16 shown in FIG. 1 and the end part is soldered to the wire connection electrode 11. When soldering, there is no need to solder all the wire connection electrodes 11 of the three-divided wire connection electrode 11. In the example shown in FIG. 3B, in the extension direction of the suspension wire 6, only two wire connection electrodes 11 are soldered.

A soldering portion 18a (shown in FIG. 3A) connecting the coil terminal wire 8 is united with the solder thereafter connecting the suspension wire 6 to form a soldering portion 18b. The three coil terminal wires 8 are all pulled out in the opposite direction to the extension direction of the suspension wire 6 using the cutout portions 15 as a guide.

Figure 4:
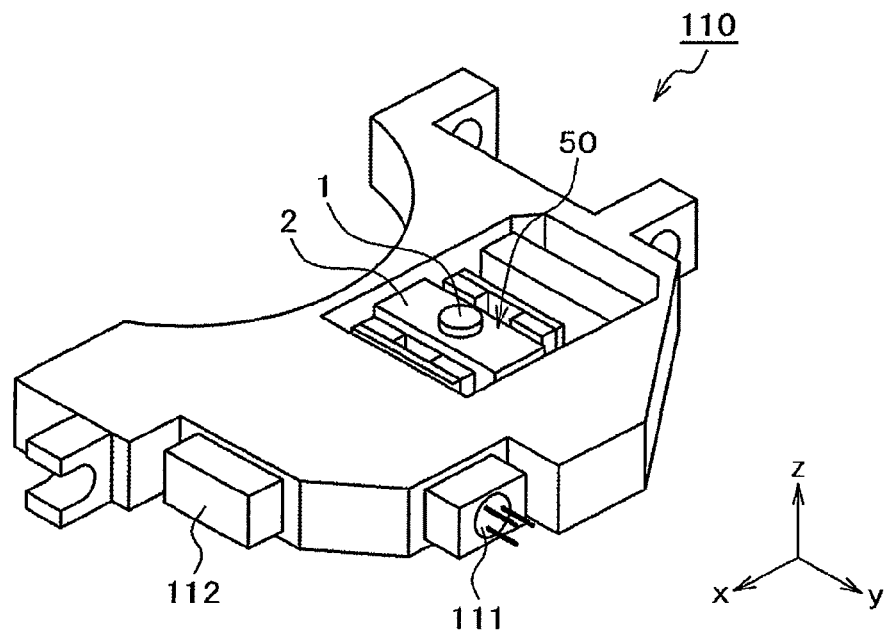
FIG. 4 is a drawing showing the optical pickup relating to the present invention.

FIG. 4 is a perspective view of the optical pickup including the object lens drive unit.

In FIG. 4, an optical pickup 110 includes a laser emitting device 111 and a photodetector 112. The laser beam emitted from the laser emitting device 111 is focused to an optical disk not drawn by the object lens 1. The focused laser beam is reflected from the optical disk, passes through the object lens 1, and enters the photodetector 112. From a signal obtained by the photodetector 112, a servo signal is detected, and on the basis of the servo signal, a drive signal is input to each coil of the object lens drive unit 50, and positioning control of the object lens 1 is executed. Further, from the signal obtained by the photodetector 112, a reproduced signal is detected and the information of the optical disk is reproduced.

The effects of this embodiment structured as mentioned above will be explained below.

In this embodiment, as shown in FIGS. 2, 3A and 3B, the coil connection electrode 12 is arranged in the neighborhood of the wire connection electrode 11 in the z direction, so that the soldering portion 18a of the coil terminal wire 8 is positioned so as to shift from the axis of the suspension wire 6. Therefore, when positioning the suspension wire 6 through the wire guide 16, the soldering portion 18a of the coil terminal wire 8 will not be an obstacle to the positioning. Further, the coil connection electrode 12 is arranged in the neighborhood of the wire connection electrode 11 in the z direction, so that all the coil terminal wires 8 can be pulled out in the opposite direction to the extension direction of the suspension wire 6.

Here, if the object lens drive unit is so structured that the coil terminal wires are pulled out even in the extension direction of the suspension wire 6, it is difficult to install the wire guide 16 in the neighborhood of the connection substrate 5, and it becomes difficult to position the suspension wire 6, particularly to keep the distance from the connection substrate 5 fixed, and if the connection position is shifted, there is a fear that the lens holder 2 may be inclined and fixed.

Further, if the wire guide 16 is installed, the suspension wire 6 can be fixed in the wire guide 16 by an adhesive, and even if the lens holder 2 is driven, the soldering portion 18b on the wire connection electrode 11 is not loaded, and there is no fear of failure of the soldering portion. Further, each of the coil terminal wires 8 is pulled out using the corresponding cutout portions 15 as a guide, so that the coil terminal wires 8 can be prevented from a short-circuit due to contact.

Furthermore, the connection electrodes 13 and the cutout portions 15 are in a symmetric shape to the central axis 14, so that if the two are turned over, the same connection substrates 5 can be used on both sides of the lens holder 2. By doing this, only one kind of connection substrate 5 will do, and there is no need to provide two kinds of connection substrates on both sides, so that the part cost can be reduced. Further, when assembling, there is no fear of attachment of a wrong connection substrate to the lens holder 2, and an assembly error can be prevented.

In this embodiment, the wire connection electrode 11 and the coil connection electrode 12 are not formed integrally in a rectangular shape but the wire connection electrode 11 is formed in a three-divided shape. The reason is to prevent the soldering portion 18a from disturbing the positioning of the suspension wire 6, which is caused by the spreading of the soldering portion 18a to the wire connection electrode 11 that occurs when the coil terminal wire 8 is soldered. As mentioned above, if the shape prevents solder drops and can permit that the wire connection electrode 11 and the coil connection electrode 12 are electrically connected to each other and that, even if they are turned over against the central axis 14, they can be used similarly, it is acceptable and other various shapes may be considered.

{Embodiment 2}

Figure 5:
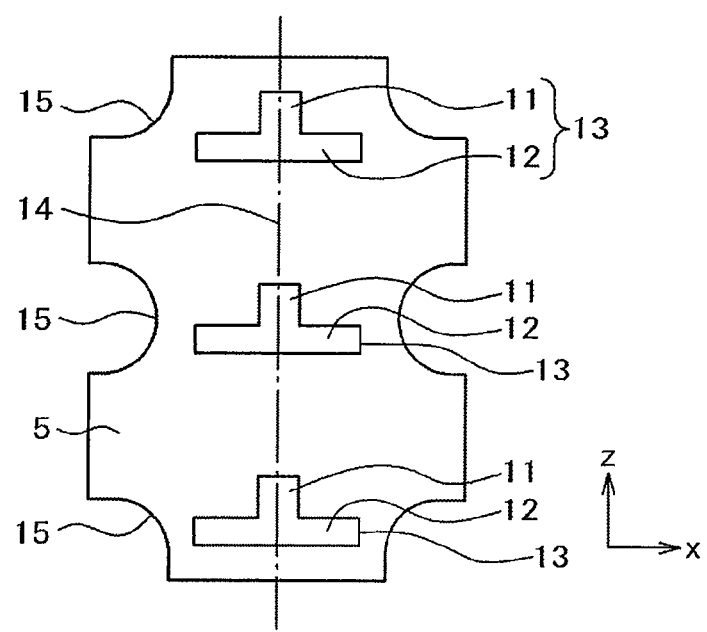
FIG. 5 is a plan view of the connection substrate relating to the second embodiment of the present invention.

FIG. 5 is a plan view of the connection substrate used in the object lens drive unit relating to the second embodiment.

In FIG. 5, in this embodiment, a shape in which only the central portion of the wire connection electrode 11 divided into three parts in the first embodiment is left is used. By doing this, even in this embodiment, the object lens drive unit can be used similarly to that of the first embodiment.

In this embodiment, the soldering portion of the suspension wire 6 is only one portion, that is, simple, though the area of the soldering portion is reduced, so that the connection strength is lowered. Further, the suspension wire 6 can be fixed in the wire guide 16 and, when the load applied to the solder connection portion is small, the assembly in this embodiment is made easier.

{Embodiment 3}

Figure 6:
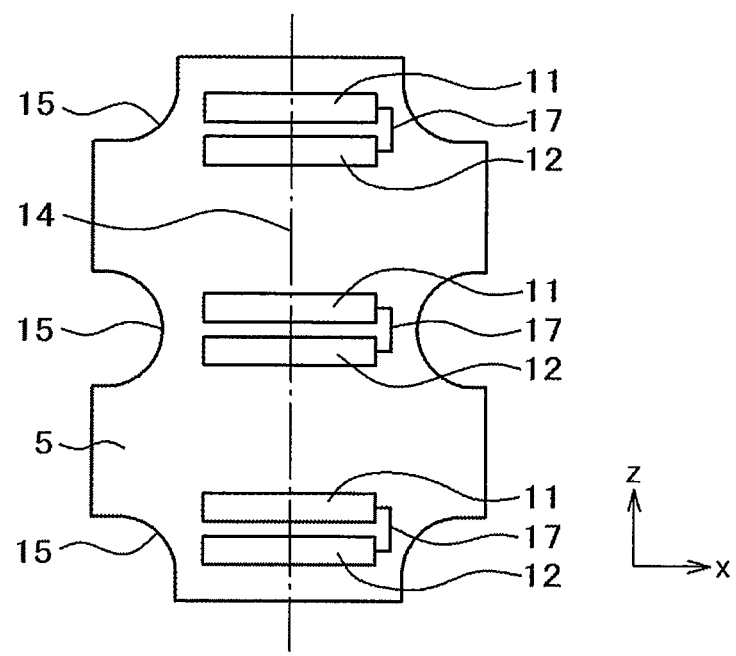
FIG. 6 is a plan view of the connection substrate relating to the third embodiment of the present invention.

FIG. 6 is a plan view of the connection substrate used in the object lens drive unit relating to the third embodiment.

In FIG. 6, in this embodiment, the wire connection electrode 11 is formed in a rectangular shape similarly to that of the coil connection electrode 12 and is separated from the coil connection electrode 12, then the wire connection electrode 11 and the coil connection electrode 12 are connected by another wire 17.

Namely, the wire 17 does not affect the soldering operation, so it does not need to be symmetric to the central axis 14 as shown in FIG. 6. Therefore, although the size in the z direction for arrangement of the electrodes is increased in correspondence to the gap between the wire connection electrode 11 and the coil connection electrode 12, there is an advantage of surely preventing solder drops.

As mentioned above, according to the present invention, the wire connection electrodes and coil connection electrodes are arranged in line with each other in the optic axis direction (z direction) of the object lens, so that the soldering position of the terminal wire of each coil (hereinafter called the coil terminal wire) is shifted from the axis of the suspension wire, and, when moving and positioning the suspension wire along the axis, the soldering portion of the coil terminal wire will not disturb the movement.

Further, since all the coil terminal wires can be pulled out in the opposite direction to the extension direction of the suspension wires and the guides for positioning the suspension wires can be installed in the extension direction of the suspension wires, the distances between the suspension wires and the connection substrates can be accurately adjusted and the fixed position precision can be increased.

Further, since the symmetric shape to the central axis parallel to the z direction is provided, the same connection substrates can be turned over and used on both sides of the lens holder. This can reduce the types of parts to decrease the cost and moreover can prevent a part loading error.

Further, according to the constitution that the sides of the connection substrate have the cutout portions, the coil terminal wires are respectively pulled out along the corresponding cutout portions, thus the coil terminal wires can be prevented from a short-circuit due to contact. The cutout portions may be formed only on the side of pulling out the coil terminal wires; however, if the symmetric shape with the cutout portions arranged on both sides is provided, on both sides of the lens holder, the same connection substrates can be used.

Furthermore, according to the constitution that each wire guide is installed in the neighborhood of the corresponding connection substrate, the suspension wire is permitted to pass through the guide portion of the wire guide, thus the suspension wire can be positioned highly precisely and can be soldered to the connection substrate, so that the fixed position precision of the lens holder can be increased. Further, the wire guide can be used as a pressing face even in positioning of the connection substrate when fixing it to the lens holder.

Further, in the wire guide, the suspension wire can be fixed using an adhesive, thus the connection between the suspension wire and the lens holder can be made stronger. Namely, when the lens holder is driven, the soldering portion of the suspension wire to the connection substrate is not loaded and there is no fear of failure of the soldering portion.

What is claimed is:

1. An object lens drive unit comprising:
 a lens holder with an object lens attached thereto;
 a plurality of driving coils attached to said lens holder;
 connection substrates attached to both sides of said lens holder; and
 a plurality of suspension wires with end parts thereof connected to said connection substrates for operatively supporting said lens holder, wherein
 on said connection substrates, wire connection electrodes for connecting said suspension wires and coil connection electrodes electrically connected to said wire connection electrodes for connecting coil terminal wires of said coils are arranged in line in an optic axis direction of said object lens, and
 said wire connection electrodes and said coil connection electrodes are formed in a symmetric shape with respect to a central axis parallel to said optic axis direction.

2. The object lens drive unit according to claim 1, wherein:
 said connection substrates have cutout portions on sides in correspondence to said coil terminal wires, and
 said cutout portions are arranged on both sides symmetrically to said central axis.

3. The object lens drive unit according to claim 1, wherein:
 said lens holder has wire guides with guide portions installed for permitting said suspension wires to pass through, and
 said wire guides are adjacent to sides of said connection substrates in an extension direction of said suspension wires and are installed so as to project from said lens holder.

4. The object lens drive unit according to claim 1, wherein:
 said wire connection electrodes and said coil connection electrodes are separated and formed in a rectangular shape, and
 said separated wire connection electrodes and coil connection electrodes are connected with wires.

5. An optical pickup including said object lens drive unit stated in claim 1 as an object lens driving means.

6. The object lens drive unit according to claim 1, wherein
 said coil connection electrodes are formed in a rectangular shape along an extension direction,
 said wire connection electrodes are formed in a rectangular shape along said extension direction and are each divided into plural parts in said extension direction, and
 said coil connection electrodes and said wire connection electrodes are adjacent and connected to each other in said optic axis direction.

7. An object lens drive unit comprising:
 a lens holder with an object lens attached thereto;
 three driving coils attached to said lens holder which drive the lens holder in a focusing direction, a tracking direction, and a tilt direction, respectively;
 connection substrates attached to both sides of said lens holder;
 three suspension wires with end parts thereof connected to said connection substrates for operatively supporting said lens holder, wherein
 on said connection substrates, three wire connection electrodes for connecting said suspension wires and three coil connection electrodes electrically connected to said wire connection electrodes for connecting coil terminal wires of said coils are arranged in line in an optic axis direction of said object lens,
 the distance between said wire connection electrodes in said optic axis direction and the distance between said coil connection electrodes in said optic axis direction are equal to each other, and
 said wire connection electrodes and said coil connection electrodes are formed in a symmetric shape with respect to a central axis parallel to said optic axis direction.

* * * * *